UNITED STATES PATENT OFFICE.

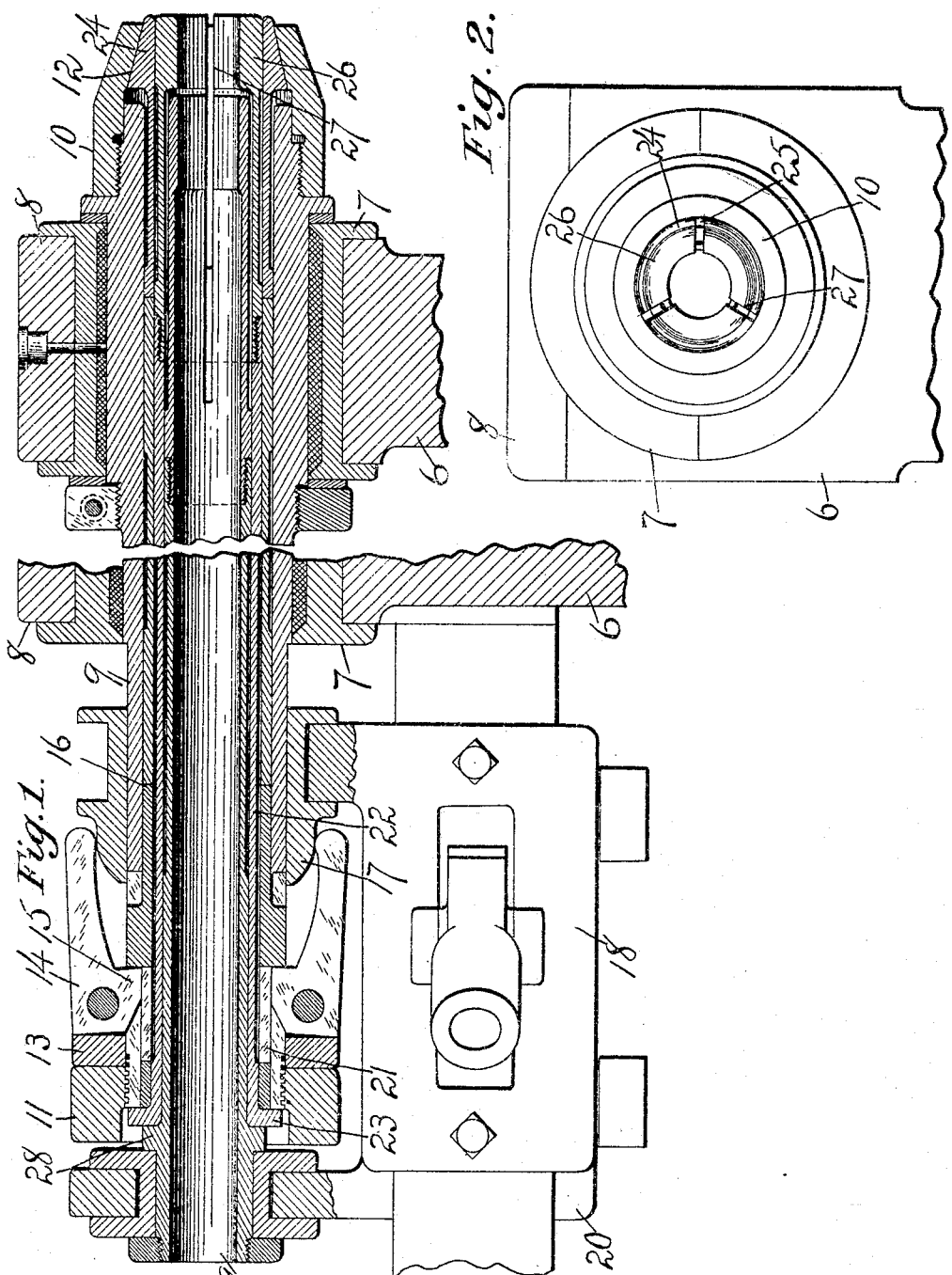

WALTER B. PEARSON, OF CHICAGO, ILLINOIS, AND ERNEST R. SEWARD, OF HARTFORD, CONNECTICUT; SAID SEWARD ASSIGNOR TO THE HARTFORD MACHINE SCREW COMPANY, OF HARTFORD, CONNECTICUT, A CORPORATION OF CONNECTICUT.

CHUCK.

939,304.  Specification of Letters Patent.  Patented Nov. 9, 1909.

Application filed June 10, 1908. Serial No. 437,689.

*To all whom it may concern:*

Be it known that we, WALTER B. PEARSON and ERNEST R. SEWARD, each a citizen of the United States, and residents, respectively, of Chicago, in the county of Cook and State of Illinois, and Hartford, in the county of Hartford and State of Connecticut, have invented a new and Improved Chuck, of which the following is a specification.

This invention relates to the class of devices used for holding pieces of material for operation thereon by tools, as cutting and forming tools, and the object of the invention is to provide a device of this class having numerous novel features of advantage and utility.

One form of device in the use of which these objects may be attained is illustrated in the accompanying drawings, in which—

Figure 1 is a view of a portion of the work holding spindle containing operating parts of a machine commonly known as a screw machine, the spindle and immediately associated elements being shown in longitudinal section. Fig. 2 is an end view of the same.

In the accompanying drawings only so much of a machine as is necessary to a thorough understanding of our invention has been shown, parts of the machine and of the spindle being broken away as shown in Fig. 1.

The numeral 6 denotes portions of standards properly disposed upon the base or bed and having bearings composed of boxes 7 of usual form and construction and cap plates 8 for retaining the parts in position. A tubular spindle 9 is properly mounted for rotation in said bearings, a cap 10 being secured to the front or blank holding end of the spindle, and a thrust collar 11 at the opposite end. The cap 10 has a beveled inner surface 12, and as shown herein is secured by interengaging screw threads. The thrust collar 11 also has screw threads engaging screw threads upon the spindle and by means of which it may be adjusted longitudinally of the spindle to properly locate a chucking lever support 13 bearing thereon chucking levers 14 pivotally mounted. Each of the chucking levers 14 has a nose 15 engaging the end of a chucking tube 16, which is preferably and as shown herein made of tubular sections, the end of each abutting against another section of the tube. The free ends of the chucking levers engage a wedge 17 slidably mounted upon the spindle and actuated by a slide 18.

A feed tube 19 is located within the spindle and is actuated by a slide 20.

All of the parts hereinabove described with the exception of the chucking tube or jaw closer are of ordinary and well-known construction and operation, and further description thereof is deemed unnecessary herein.

It will be understood that the spindle is rotated by suitable mechanism located upon the spindle between the standards 6 in the usual manner. A bearing thimble 21 is located at the rear end of the spindle 9, affording a bearing at this end for a collet sleeve 22. This collet sleeve has a flange 23 at this end engaging the end of the spindle 9, and it will thus be seen that, the spindle being held in its bearings against longitudinal movement, the collet sleeve has a limited forward movement.

The front end or section of the chucking tube, above described, is wedge-shaped and is split as at 25 forming a jaw closer 24. The beveled part of the jaw closer coöperates with the beveled inner surface of the cap 10 to move the jaws or collet 26 radially inward. It will thus be seen that when the chucking tube is moved toward the front end of the spindle by the operation of the chucking levers 14, the beveled surface of the jaw closer wedging between the beveled inner surface 12 of the cap 10 and the jaws or collet 26 will cause the latter to be forced radially inward. These jaws are formed by slots 27 in the end of the collet, and this action of the jaw closer causes the jaws to be forced radially inward. It will be noted, however, that the jaws cannot move farther forward for the reason that they are securely held by engagement of the flange 23 with the end of the spindle. This feature is of especial advantage in that the stock is not advanced to any extent by the action of the jaws but is maintained accurately in the position to which it has been moved by the feed tube, and the jaws and closer both being split act practically as a solid piece when the jaws are closed against the stock, so that there is no looseness between the parts and therefore no movement whatever, thus relieving the device from any liability to "chatter".

The jaw closer and the collet are both constructed of spring metal so that there is a constant tendency of the jaws to spring outward radially, and therefore when the pressure of the chucking levers 14 is relieved from the chucking tube this tendency of the jaws to spring radially outward causes the collet and jaw closer to move backward under the influence of the beveled inner surface 12 on the cap 10. The jaws being held at the rear end from longitudinal movement there is practically no frictional resistance to their radial movement so that the action of the parts is extremely free and easy, the jaws, in fact, in this respect having free radial movement. The jaws have been described herein as held at the rear end, this term being used to denote a structure in which the jaws are not held at the front end but preferably at a point back of that portion of the jaws which have a radial movement, so that this means for limiting the forward movement of the jaws shall not in any way impede the free radial action thereof. Under the spring action radially of the jaw closer and the jaws both of these parts together with the stock move backward when pressure by the levers 14 is removed. This construction by which the stock, jaw closer and collet or jaws may simultaneously move backward enables the release of the parts by the application of comparatively little force for the reason that there is no frictional resistance to such movement except by the beveled surface 12 on the cap 10, and the tendency being to move away from this beveled surface, there is practically no resistance at this point and the action of the parts is therefore easy and sure.

It will be noted that the construction provides means whereby the capacity of a chuck of a given size may be increased, the collet being removed and the jaw closer acting as the jaws. In such use the jaws would, of course, act as in the old form of this style of chuck.

We claim:—

1. A chuck including a cap having a beveled inner surface, a jaw closer movable axially of the chuck and having a coöperating beveled surface arranged to move away from the beveled surface on the cap in a movement to release the jaws, jaws having radial movement and a longitudinal movement, the latter independent of the jaw closer, and arranged to be actuated thereby, and means for operating the jaw closer.

2. A chuck including a cap having a beveled inner surface, a jaw closer including radially movable fingers having a coöperating beveled surface arranged to move away from the beveled surface on the cap in a movement to release the parts, jaws having radial movement permitted by the operation of the jaw closer and a longitudinal movement independently thereof, and means for operating the jaw closer.

3. A chuck including a cap having a beveled inner surface jaws having free radial movement and also having longitudinal movement, a jaw closer having movement axially of the chuck to close the jaws, and also having a beveled surface arranged to move away from the beveled surface on the cap in a movement to release the jaws, means for operating the jaw closer, said jaw closer and jaws being arranged to move backward simultaneously but also having independent longitudinal movement, and means for operating the jaw closer.

4. A chuck including a cap having a beveled inner surface jaws having free radial movement and also having longitudinal movement, a jaw closer to move axially of the chuck and having fingers to close the jaws, and also having a beveled surface arranged to move away from the beveled surface on the cap in a movement to release the jaws, means for operating the jaw closer, said closer and jaws having simultaneous backward movement but also having independent longitudinal movement, means for limiting the forward movement of the jaws, and means for operating the jaw closer.

5. A chuck including a cap having a beveled inner surface, a jaw closer having a coöperating beveled surface arranged to move away from the beveled surface on the cap in a movement to release the jaws, jaws movable radially and also longitudinally, a feed tube operating to move the jaws forward, means for operating the feed tube, means for limiting the forward movement of the jaws, and means for operating the jaw closer.

6. A spindle, a cap secured to the spindle and having a beveled inner surface, a jaw closer including fingers having a coöperating beveled surface to move away from the beveled surface on the cap in the opening movement, means for operating the jaw closer, a sleeve having chuck jaws movable radially, said sleeve having a longitudinal movement, means on the sleeve to engage the spindle to limit its forward movement, a feed tube arranged to move said sleeve forward, and means for operating said feed tube.

7. A spindle having a cap with a beveled inner surface, a jaw closer movable axially of the chuck and having a coöperating beveled surface to move away from the beveled surface on the cap in the opening movement of the jaws, said jaw closer having movement longitudinally of the chuck, means for operating the jaw closer, a collet having spring fingers constituting jaws at its free end, a feed tube arranged to move said collet longitudinally, means for operating the feed tube, and means on the spindle for limiting the forward movement of the jaw closer.

8. A spindle having a cap with a beveled inner surface, a jaw closer having a coöperating beveled surface to move away from the beveled surface on the cap in the opening movement of the chuck jaws, means for operating the jaw closer to close the jaws, a collet having spring fingers with jaws at its free end thereof, said collet being movable longitudinally, a feed tube arranged to move the collet forward, means for operating the feed tube, and means to limit the forward movement of the collet.

9. A chuck spindle, a jaw closer located within the spindle and movable longitudinally to operate the chuck jaws, means for operating the jaw closer, a longitudinally movable collet having jaws at its end operated upon by the jaw closer and extending through said spindle and having a flange at its opposite end and means to engage said flange to limit forward movement of the collet.

10. A spindle, a jaw closer extending through the spindle, means for moving the jaw closer longitudinally to close the jaws, a longitudinally movable collet extending through the spindle and having jaws at one end actuated by the jaw closer and a flange at its opposite end to engage the spindle to limit forward movement, a feed tube located within the spindle, means upon the feed tube to engage the collet to hold it from longitudinal movement, and means for operating the feed tube.

11. A spindle, a jaw closer located within the spindle, means for operating the jaw closer, a longitudinally movable collet including spring fingers with jaws at their free ends operated by the jaw closer, a feed tube arranged to move the collet forward, and means upon the spindle to engage the collet to hold it against longitudinal movement during operation of the jaw closer.

12. A spindle, a jaw closer extending longitudinally within the spindle, means for operating the jaw closer, a collet including spring fingers with jaws at their free ends operated by the jaw closer, said collet extending through the spindle and having a flange at its rear end, means to engage said flange to limit forward movement, a feed tube located within the spindle and having a shoulder to engage said collet to hold it against longitudinal movement during operation of the jaw closer, and means for operating the feed tube.

13. A chuck including a jaw closer movable axially of the chuck, means for operating the jaw closer, a longitudinally movable collet having radially movable jaws operated by the jaw closer, a feed tube constructed to engage the collet to temporarily hold it against longitudinal movement in one direction, means to temporarily prevent longitudinal movement of the collet in the opposite direction, and means for operating the feed tube.

14. A chuck including a jaw closer movable axially of the chuck to close the jaws, means for operating the jaw closer, a longitudinally movable collet having spring fingers with jaws at the free end thereof, a feed tube constructed to temporarily hold the collet against longitudinal movement in one direction, means for temporarily holding the collet against longitudinal movement in the opposite direction, and means for operating the feed tube.

WALTER B. PEARSON.
ERNEST R. SEWARD.

Witnesses for Walter B. Pearson:
  W. E. COOPER,
  L. V. BAIN.

Witnesses for Ernest R. Seward:
  ARTHUR B. JENKINS,
  LENA E. BERKOVITCH.